United States Patent
Medina

(10) Patent No.: US 12,254,301 B2
(45) Date of Patent: Mar. 18, 2025

(54) SOFTWARE LIBRARY FOR CLOUD-BASED COMPUTING ENVIRONMENTS

(71) Applicant: Microsoft Technology Licensing, LLC, Redmond, WA (US)

(72) Inventor: Timothy Shawn Medina, Forsyth, GA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 143 days.

(21) Appl. No.: 17/673,702

(22) Filed: Feb. 16, 2022

(65) Prior Publication Data
US 2023/0259343 A1 Aug. 17, 2023

(51) Int. Cl.
*G06F 8/60* (2018.01)
*G06F 21/10* (2013.01)
*H04L 9/40* (2022.01)
*H04L 67/10* (2022.01)

(52) U.S. Cl.
CPC ............. *G06F 8/60* (2013.01); *H04L 63/08* (2013.01); *H04L 67/10* (2013.01); *G06F 21/105* (2013.01)

(58) Field of Classification Search
None
See application file for complete search history.

(56) References Cited

U.S. PATENT DOCUMENTS

| | | | |
|---|---|---|---|
| 9,866,433 B1* | 1/2018 | Fakhouri | H04L 41/0806 |
| 10,999,356 B2* | 5/2021 | Chen | H04L 67/10 |
| 11,765,244 B1* | 9/2023 | Barclay | H04L 67/51 |
| | | | 709/226 |
| 2015/0178065 A1* | 6/2015 | Valkov | G06F 9/453 |
| | | | 717/169 |

(Continued)

FOREIGN PATENT DOCUMENTS

WO    2009018489 A2    2/2009

OTHER PUBLICATIONS

Benson, "Survey of Automated Software Deployment for Computational and Engineering Research", 2016, IEEE (Year: 2016).*

(Continued)

*Primary Examiner* — Hossain M Morshed
(74) *Attorney, Agent, or Firm* — NovoTechIP International PLLC

(57) ABSTRACT

A data processing system implements techniques for deploying software on a cloud-based computing environment. The techniques include receiving, from a first client device, a first request to deploy first software from a centralized software library of a cloud-based computing environment accessible by a plurality of tenants of the cloud-based computing environment, the first request including a location of the first software in the centralized library, authentication credentials for a first user, and deployment parameters indicating how the first software is to be deployed in the cloud-based computing environment; authenticating the first user to determine that the user is authorized to deploy (Continued)

the first software in the cloud-based computing environment; and deploying the first software from the centralized library of the cloud-based computing environment responsive to the first user being authorized to deploy the first software in the cloud-based computing environment.

14 Claims, 11 Drawing Sheets

(56) References Cited

U.S. PATENT DOCUMENTS

| | | | |
|---|---|---|---|
| 2015/0350101 A1* | 12/2015 | Sinha | H04L 67/10 |
| | | | 709/226 |
| 2018/0027050 A1* | 1/2018 | Pogrebinsky | H04L 63/10 |
| | | | 709/223 |
| 2018/0211115 A1* | 7/2018 | Klein | G06Q 20/14 |
| 2019/0089602 A1* | 3/2019 | Bagade | H04L 41/082 |
| 2019/0196800 A1* | 6/2019 | Shodhan | H04W 4/50 |
| 2020/0285488 A1* | 9/2020 | Yao | G06F 8/36 |
| 2021/0064347 A1* | 3/2021 | Junior | G06F 8/30 |
| 2021/0064723 A1* | 3/2021 | Drake | H04L 9/3247 |
| 2022/0029820 A1* | 1/2022 | Mozano | H04L 9/0891 |
| 2023/0259343 A1* | 8/2023 | Medina | G06F 9/5072 |
| | | | 717/177 |

OTHER PUBLICATIONS

"International Search Report and Written Opinion Issued in PCT Application No. PCT/US22/051030", Mailed Date: Feb. 23, 2023, 12 Pages.

* cited by examiner

Software Deployment Dashboard

The deployment dashboard provides tools that assist you with deploying software into your cloud computing environment.

_Software Library_
You may deploy software directly from the library. You can also keep track of your available licenses and obtain additional licenses if necessary.

| | Application A | View License Keys | Deploy Software |
| | Application B | View License Keys | Deploy Software |
| | Application C | View License Keys | Deploy Software |
| | Application D | View License Keys | Deploy Software |

_Custom Software Library_
The customer-specific software library includes software that has been specifically developed by or for your organization. You may add additional software to the customer-specific software library. The software in the customer-specific software library will not be visible to users outside of your organization.

| | Application E | No Key Required | Deploy Software |
| | Application F | No Key Required | Deploy Software |
| | Application G | View License Keys | Deploy Software |
| | Application H | View License Keys | Deploy Software |

FIG. 4

Software License Management Dashboard

The license dashboard provides tools that assist you with managing licenses for the software in your cloud computing environment.

<u>Software Library</u>
You may deploy software directly from the library. You can also keep track of your available licenses and obtain additional licenses if necessary.

- Application A — Manage Keys
- Application B — Manage Keys
- Application C — Manage Keys
- Application D — Manage Keys <u>Custom Software Library</u>
The following software is included in your custom software library. This software has been developed by or for your organization. Some software included in the custom library may not require

- Application E — No Key Required
- Application F — No Key Required
- Application G — Manage Keys
- Application H — Manage Keys

FIG. 5A

Software License Management Dashboard – Manage License Keys

The license dashboard provides tools that assist you with managing licenses for the software in your cloud computing environment.

Application A
You have purchased 100 keys for Application A. You currently have 60 keys in use and 40 available for deployment.

Filter List    In-Use >

- Application A, Ver. 2022a, Build 2022a-1, Key: 1122-3344-5566-7788A   View Details
- Application A, Ver. 2022a, Build 2022a-1, Key: 1122-3344-5566-7788B   View Details
- Application A, Ver. 2022a, Build 2022a-1, Key: 1122-3344-5566-7788C   View Details
- Application A, Ver. 2022a, Build 2022a-1, Key: 1122-3344-5566-7788D   View Details
- Application A, Ver. 2022a, Build 2022a-1, Key: 1122-3344-5566-7788E   View Details
- Application A, Ver. 2022a, Build 2022a-1, Key: 1122-3344-5566-7788F   View Details
- Application A, Ver. 2022a, Build 2022a-1, Key: 1122-3344-5566-7788G   View Details Obtain Additional Licenses
You may obtain additional licenses for Application A by clicking on "Obtain Additional Licenses" below. We will guide you through the options available to you. Any additional licenses you purchase will be automatically added to your library.

[ Obtain Additional Licenses ]

SOFTWARE LIBRARY FOR CLOUD-BASED COMPUTING ENVIRONMENTS

BACKGROUND

Managing software and other resources on a cloud-based computing environment is a complex task. The cloud-based computing environment may be divided into logical "tenants," each having their own associated set of user accounts, resources, software, software licenses, and policies. Each tenant may be associated with an organization, such as but not limited to, a corporation, government entity, university or other learning institution, and other types of organizations that utilizes cloud-based computing services to provide services to users associated with the organization. Furthermore, some large organizations may be divided into multiple sub-entities, such as but not limited to, departments, divisions, groups, or other sub-groups within the organization. Each of these sub-entities may be associated with a separate tenant within the cloud-based computing services, which further adds to the complexity of managing software and resources for the organization.

Typically, the task of managing software deployment and the associating licensing of software falls on the system administrators for the organization to deploy software to the cloud-based services for the tenant or tenants associated with the organization. This process is typically an error-prone and labor-intensive multistep process. The system administrator must identify the correct version of the software and load the software into the storage allocated to the tenant prior to software deployment. This approach also consumes storage resources associated with the tenant, which may add to the costs of operating in the cloud-based computing environment. Furthermore, managing license keys associated with the software may be a complex process. Users may join and leave the organization, requiring purchasing of additional licenses or reassigning licenses. There are significant areas for new and improved mechanisms for handling deployment of software in cloud-based computing environments.

SUMMARY

An example data processing system according to the disclosure may include a processor and a machine-readable medium storing executable instructions. The instructions when executed cause the processor to perform operations including receiving, from a first client device of a first user, a first request to deploy first software from a centralized software library of a cloud-based computing environment accessible by a plurality of tenants of the cloud-based computing environment. The first request includes a location of the first software in the centralized software library, authentication credentials for a first user, and deployment parameters indicating how the first software is to be deployed in the cloud-based computing environment. The operations further including authenticating the first user to determine that the first user is authorized to deploy the first software in the cloud-based computing environment and deploying the first software from the centralized software library of the cloud-based computing environment responsive to the first user being authorized to deploy the first software in the cloud-based computing environment.

An example method implemented in a data processing system for providing user-centric topic recommendations includes receiving, from a first client device of a first user, a first request to deploy first software from a centralized software library of a cloud-based computing environment accessible by a plurality of tenants of the cloud-based computing environment. The first request includes a location of the first software in the centralized software library, authentication credentials for a first user, and deployment parameters indicating how the first software is to be deployed in the cloud-based computing environment. The method further including authenticating the first user to determine that the first user is authorized to deploy the first software in the cloud-based computing environment and deploying the first software from the centralized software library of the cloud-based computing environment responsive to the first user being authorized to deploy the first software in the cloud-based computing environment.

An example machine-readable medium on which are stored instructions. The instructions when executed cause a processor of a programmable device to perform operations of receiving, from a first client device of a first user, a first request to deploy first software from a centralized software library of a cloud-based computing environment accessible by a plurality of tenants of the cloud-based computing environment. The first request includes a location of the first software in the centralized software library, authentication credentials for a first user, and deployment parameters indicating how the first software is to be deployed in the cloud-based computing environment. The operations further including authenticating the first user to determine that the first user is authorized to deploy the first software in the cloud-based computing environment and deploying the first software from the centralized software library of the cloud-based computing environment responsive to the first user being authorized to deploy the first software in the cloud-based computing environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 is an example user interface for deploying of software from the software library or customer-specific software library of the cloud-based services shown in FIG. 1.

FIGS. 5A and 5B are examples of user interfaces for managing license keys included in the key vault or the customer-specific key vault of the cloud-based services shown in FIG. 1.

DETAILED DESCRIPTION

Figure 1:
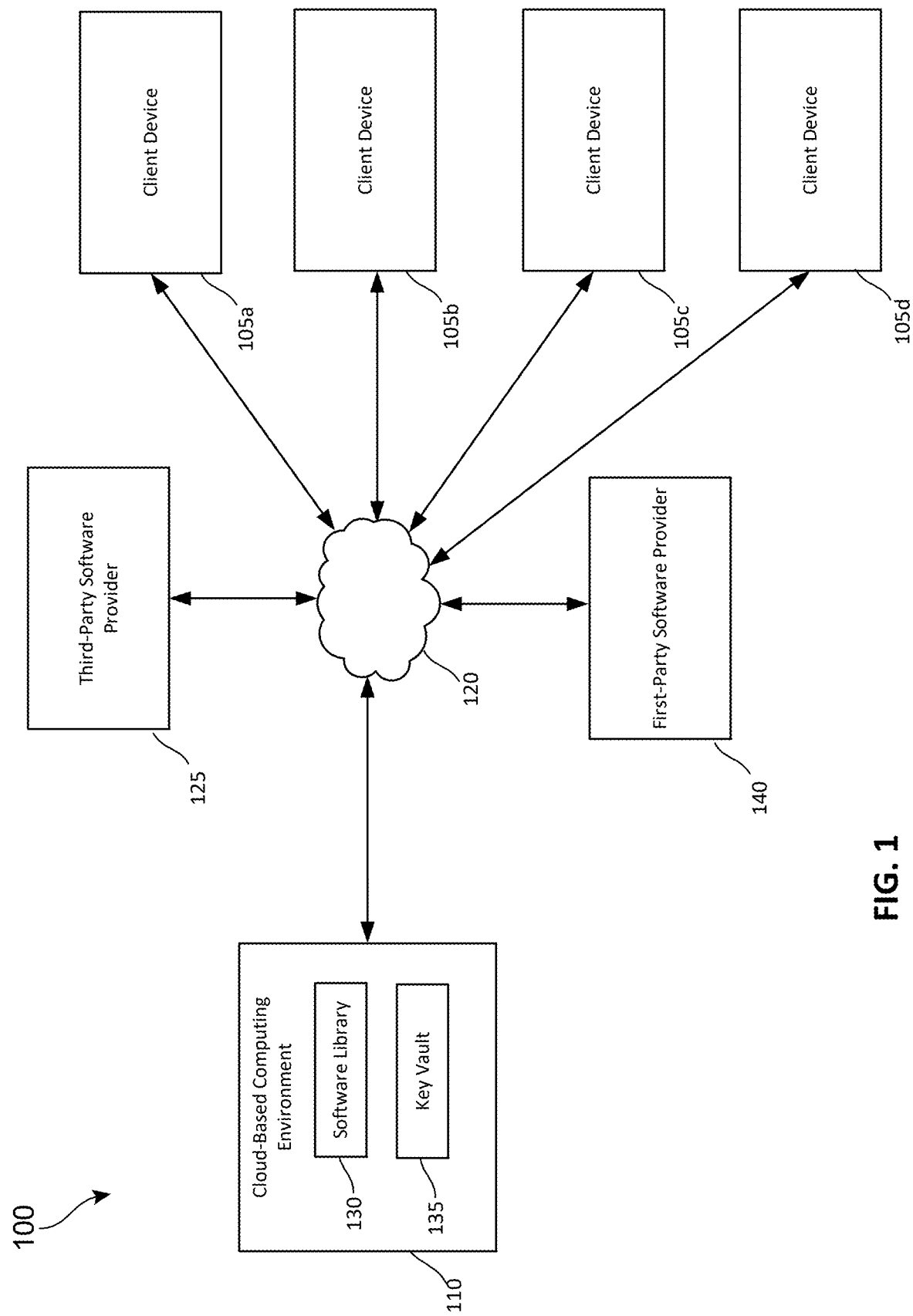
FIG. 1 is a diagram showing an example computing environment in which the techniques disclosed herein for deploying software in a cloud-based environment may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for deploying software on a cloud-based computing environment are provided. Deploying software in a cloud-based environment is currently a multistep and labor-intensive process. An administrator for a tenant of the cloud-based computing environment must identify correct version of the software to be deployed, create one or more temporary folders for preparing the software for deployment in the data storage allocated to the tenant, download into data storage allocated to the tenant of the cloud-based environment, deploy the software, and clean up any temporary files used to prepare the software for deployment. Each tenant must repeat these steps when deploying software in the cloud-based environment.

The techniques herein provide a technical solution to the technical problem of managing the deployment of software on a cloud-based computing environment by implementing a software library that serves as a centralized, cross-tenant repository for managing software that may be deployed in the cloud-based computing environment. A centralized, cross-tenant key vault may also be provided for managing the license keys for the software stored in the software library. The software in the software library may be accessed using a Universal Resource Indicator (URI) that points to the location in the library where the software resides in the data storage of the cloud-based computing environment. This approach provides several significant technical benefits. The software deployed to the cloud-based computing environment is stored in a central location that may be easily kept up to date with the latest patches and fixes. Another techniques benefit is that the deployment process may be simplified by referencing the URI for the software product stored in the library when requesting that the software be deployed in the cloud-based computing environment. The software library may create a temporary folder for storing files during the deployment process. The software library allocates data storage for both storing the software in the library and the temporary folders used during the deployment process without consuming the data storage allocated to the tenants of the cloud-based computing environment and automatically cleans up the temporary files in the temporary folders. Another technical benefit is that the library may manage the licenses associated with the software to be deployed within the technical environment. The library provides means for tracking how the licenses are being used and for providing recommendations for managing the licenses used by the organization. Yet another technical benefit is that the library provides a secure environment for controlling who may request that software be deployed in the cloud-computing environment. The library implements access controls that permit various levels of access to users within an organization to ensure that the users are permitted to perform requested actions related to the deployment of software and management of the software license keys. The library may also facilitate the management of license keys for third-party software providers who are unrelated to the provider of the cloud-based computing environment but have software that may be deployed in the cloud-based computing environment. These and other technical benefits of the techniques disclosed herein will be evident from the discussion of the example implementations that follow.

FIG. 1 is a diagram showing an example computing environment 100 in which the techniques disclosed herein for deploying software on a cloud-based computing environment may be implemented. The computing environment 100 may include a cloud-based computing environment 110, a third-party software provider 125, and a first-party software provider 140. The example computing environment may also include a plurality of client devices, such as client devices 105a, 105b, 105c, and 105d (collective referred to a client device 105). The client devices 105a, 105b, 105c, and 105d, the third-party software provider 125, and the cloud-based computing environment 110 may communicate via the network 120. The network 120 may be implemented as a combination of one or more public and/or private networks and may be implemented at least in part by the collection of networks referred to as the Internet. Additional details of the cloud-based computing environment 110, third-party software provider 125, and client devices 105a, 105b, 105c, and 105d are discussed in the example which follow. Other implementations may include a different number of client devices 105 and/or a different number of third-party software providers 125.

The cloud-based computing environment 110 may be implemented as a cloud-based service or set of services. The cloud-based computing environment 110 may be configured to provide a computing environment in which tenants may deploy and utilize various software products. Each tenant may have its own set of user accounts, resources, software, software licenses, and policies for controlling which users may perform specific actions on the computing resources allocated to the tenant. The cloud-based computing environment 110 may be implemented using Microsoft Azure or other cloud-based computing platforms.

The cloud-based services may implement a software library 130 for managing software that may be deployed by tenants of the cloud-based services 110. The software may be deployed to one or more virtual machines (VMs) of the cloud-based services 110. The software library 130 provides a central repository for storing software. A technical benefit of this approach is that the software library does not consume the storage capacity allocated to any of the tenants. Another technical benefit is that the software stored in the library may be accessed by a URI that points to the location of the software. The software may be stored in the software library 130 in various formats. The software may be stored as an executable file that may be deployed and executed as is. The software may also be stored in tarball, packfile, or other type of archive file, and the components of the software may need to be extracted from the archive file. The software stored in the software library 130 may be updated with the latest updates and fixes for each of the software products stored therein. Thus, the software that may be deployed by tenants of the cloud-based computing environment 110 are kept up to date. The software library 130 may also be configured to verify the software loaded in the library to ensure that version of the software added to the library is valid. The software library 130 may also implement policy-based access controls to control who which users of the cloud-base services 110 may access the software library 130 and which actions the users may perform on the contents of the software library 130. Additional details of the software library 130 are provided in the examples which follow.

The software included in the software library 130 may include software provided by a first-party software provider 140 and/or one or more third-party software providers 125. The first-party software provider 140 may be associated with a provider of the cloud-based computing environment 110 and may provide software that is optimized for operating in the cloud-based computing environment 110. For example, the cloud-based computing environment 110 may be implemented with the Microsoft Azure platform and the first-party software provider 140 may be Microsoft. Other implementations may utilize a platform provided by another provider to implement the cloud-based computing environment 110, and the first-party software provider 140 may be the provider of that platform. A third-party software provider 125 may also provide software that may operate in the cloud-based computing environment 110 but not implement the cloud-based computing environment 110. The software library 130 may support software obtained from both first-party and third-party software providers.

The cloud-based computing environment 110 may implement a key vault 135 for storing the license keys associated with the software stored in the software library 130. The license keys may be managed for both the first party software provider 140 and the one or more third-party software providers 125. Access to the key vault 135 may be attribute controlled based on the attributes of the user requesting access to the access to the keys. Certain users may be permitted to access the key vault 135 but may not be permitted to access the software library 130. For example, some users may have access to audit the keys associated with a particular tenant but may not have access to the software library 130. Additional details of the key vault 135 are provided in the examples which follow.

The cloud-based computing environment 110 may provide various services for the computing devices 105a-105d. The cloud-based computing environment 110 may provide a word processing application, a presentation application, project management software, a communications platform, a collaboration platform, a content sharing platform, a content creation platform, social messaging platform, and/or other services that are accessible to users via the computing devices 105a-105d. Other types of services may be provided by the cloud-based computing environment 110 in addition to or instead of these services. The services provided by the cloud-based computing environment 110 may be accessed via a native application on a computing device, via a native application configured to communicate with the cloud-based computing environment 110, via other means, or via a combination thereof. The services provided to users associated with a particular tenant of the cloud-based computing environment 110 may depend on the software installed in the cloud-based computing environment 110 for that tenant.

The client devices 105a, 105b, 105c, and 105d are computing devices that may be implemented as a portable electronic device, such as a mobile phone, a tablet computer, a laptop computer, a portable digital assistant device, and/or other such devices. The client devices 105a-105d may also be implemented in computing devices having other form factors, such as a vehicle onboard computing system, a video game console, a desktop computer, and/or other types of computing devices. Each of the client devices 105a-105d may have different capabilities based on the hardware and/or software configuration of the respective client device. While the example implementation illustrated in FIG. 1 includes four client devices, other implementations may include a different number of client devices.

Figure 2A:
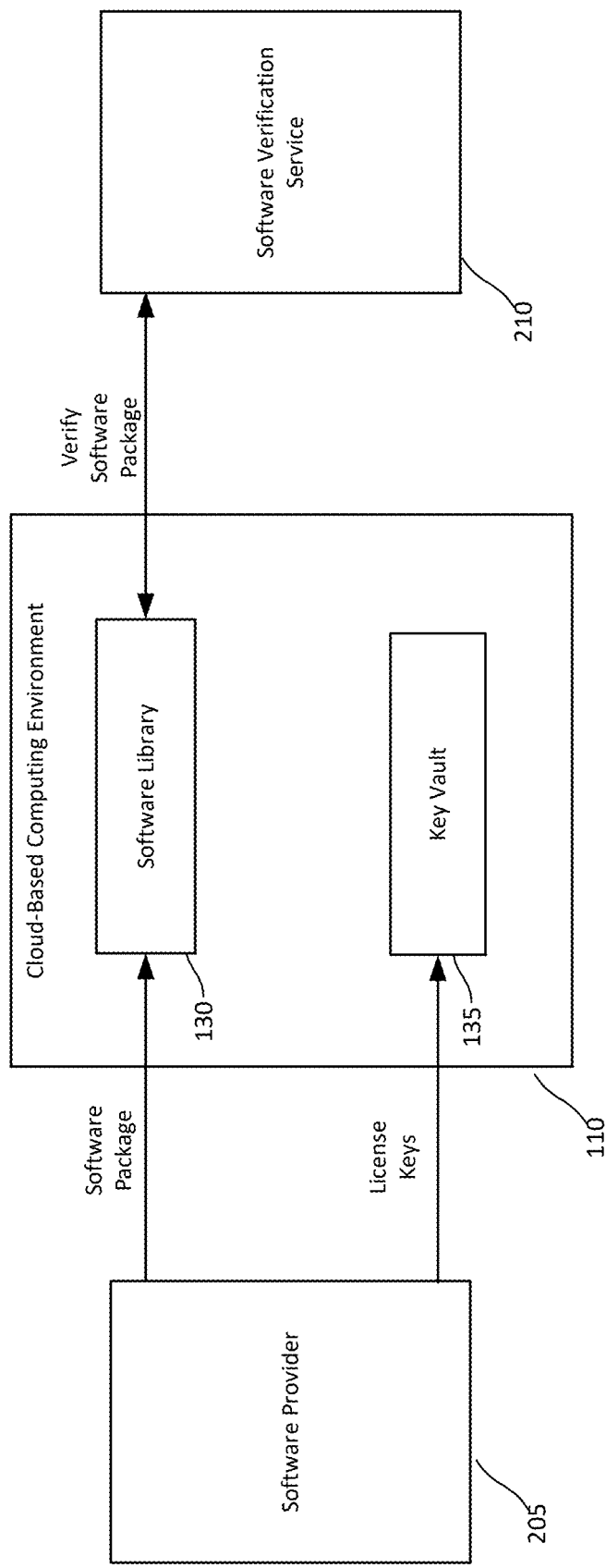
FIGS. 2A and 2B are diagrams showing adding of software to the software library or customer-specific software library of the cloud-based services shown in FIG. 1.

FIG. 2A is a diagram showing additional details of the cloud-based computing environment 110 shown in FIG. 1. The cloud-based computing environment 110 may interact with a software provider 205 and a software verification service 210. The software provider 205 may provide software for one or more software applications to be included in the software library 130 of the cloud-based services. The software provider 205 may also provide license keys for the software that may be stored in the key vault 135 of the cloud-based services. The software provider 205 may be a first party software provider, such as the first-party software provider 140, or a third-party software provider, such as the third-party service provider 125. A technical benefit of the cloud-based computing environment 110 is that the software and licenses for third-party software providers may be managed on behalf of the third-party software providers that may otherwise have no means for tracking the software that has been deployed to the cloud-based computing environment 110. The cloud-based computing environment 110 may also track which license keys have been utilized within the cloud-based computing environment 110. The cloud-based computing environment 110 may provide means for the third-party software providers to audit which software and license keys have been deployed by tenants of the cloud-based computing environment 110.

The software provider 205 may provide a request to add a software package in the software library 130 of the cloud-based services 130. The software provider 205 may provide the software package with the request for storage in the software library 130 and one or more license keys for storage in the key vault 135. The request may also include authentication credentials that enable the cloud-based computing environment 110 to determine that the requestor is authorized to provide software packages for storage in the software library 130.

The authentication may be performed using a shared access signature (SAS). An SAS is a signed URI that points to one or more storage resources in the cloud-based computing environment provided by the cloud-based computing environment 110. The URI includes a token that indicates how the requestor (the software provider 205 in this example) may access the storage resources. The token includes a set of SAS parameters. One of these parameters is a signature constructed from the SAS parameters and signed with a key used to create the SAS. The cloud-based computing environment 110 may use this signature to authorize access to the storage resource, and thus, permit the software package provided by the software provider 205 to be added to the software library 130. The URI may point to a specific location in the software library allocated for storing the software package provided by the software provider 205.

The software verification service 210 may analyze the software package to ensure that the software package has not been tampered with or corrupted. The software package may be encrypted and signed by the software provider 205 using various techniques. The software verification service 210 may be configured to verify the signature of the software package. If the software package has not been tampered with or corrupted, the software library 130 may store the software package for deployment by tenants of the cloud-based computing environment 110, and the cloud-based computing environment 110 may notify the software provider 205 that the software package has been accepted. If the software package appears to have been tampered with or corrupted, the cloud-based computing environment 110 may discard the software package and notify the software provider 205 that the software package has been rejected.

Figure 2B:
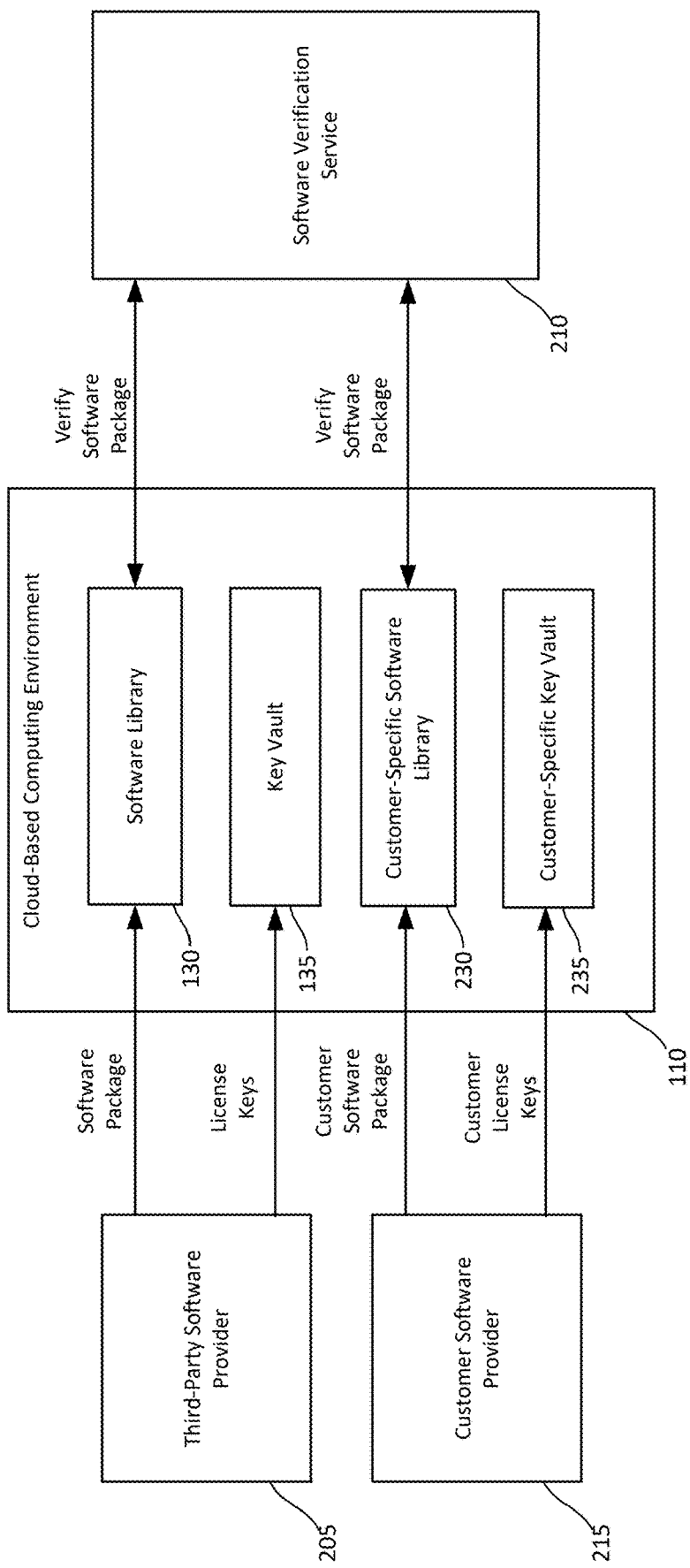

FIG. 2B is a diagram showing an example implementation shown in FIG. 2A in which the cloud-based computing environment 110 includes a customer-specific software library 230 and a customer key vault 235. The customer-specific software library 230 may be used to store customer-specific software packages that may have been develop by or for a tenant of the cloud-based computing environment 110. Some tenants may deploy custom software products in the cloud-based computing environment 110 from a customer software provider 215 within the organization. The software provider 215 may be software repository maintained on a server of the organization that is external to the cloud-based computing environment 110. Each tenant may have a customer-specific software library 230 and a customer key vault 235 for storing the tenant's custom software and associated license keys. The customer-specific software may not require a license key in some implementations, because the customer-specific software is typically deployed within an organization. The software verification service 210 may analyze the software package to ensure that the software package has not been tampered with or corrupted. The cloud-based computing environment 110 may accept or discard the software package received from the customer based on the results of the analysis by the software verification service 210.

Administrators for each of the tenants may define attributes of each of the users associated with the tenant. These attributes may be used to determine which actions that the user may perform on the software library 130, the key vault 135, the customer-specific software library 230, and the customer-specific key vault 135. Some users may have read-only access to view the software stored by the software library 130 and/or the customer-specific software library 230 and/or the license keys stored by the key vault 135 and/or the customer-specific key vault 235. Other users may be permitted to add software to the customer-specific key vault 235, and/or deploy software from the software library 130 and/or the customer-specific software library 230. The users may be associated with specific role that define the attributes of the user or the attributes may be assigned to the users by the administrator. The user attribute information may be stored in user profiles. The user profiles may be stored in a directory or datastore. The cloud-based computing environment 110 may implement a cloud-based identity and access management service that provides a user interface for administrators to manage user profiles. In some implementations, the cloud-based identify and access management services may be implemented separately from the cloud-based computing environment 110 but may be used to manage user access to the cloud-based computing environment 110 and other cloud-based services. The cloud-based identify and access management service may be implemented using Microsoft Azure Active Directory or other such services.

Figure 3A:
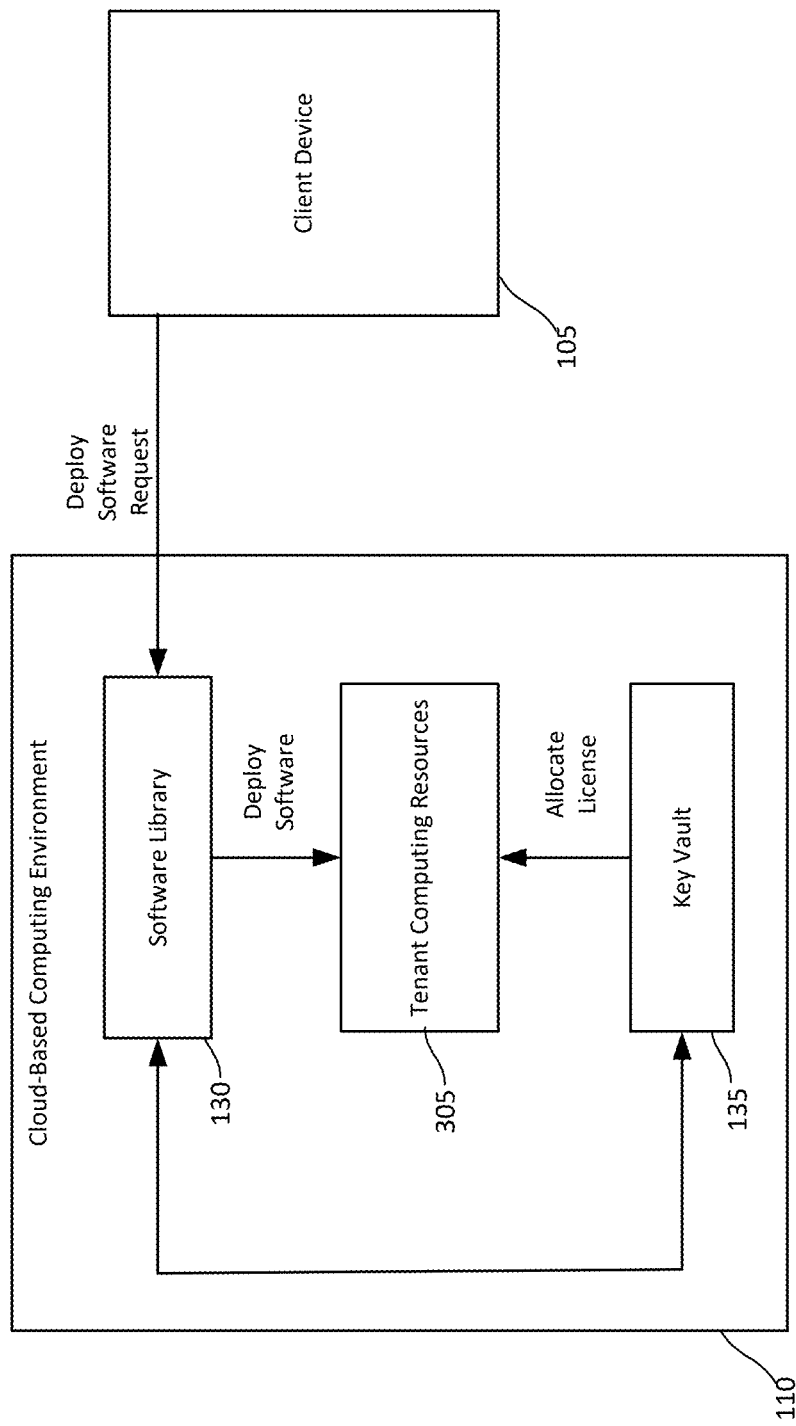
FIGS. 3A and 3B are diagrams showing deploying of software from the software library or customer-specific software library of the cloud-based services shown in FIG. 1.

FIG. 3A is a diagram of the cloud-based computing environment 110 that shows how a request to deploy software from the software library 130 may be processed by the cloud-based computing environment 110. In the example shown in FIG. 3A, the client device 105 of a user may send a deploy software request to deploy software specified in the request from the software library 130 to a cloud-based virtual machine (VM) of the cloud-based computing environment 110. The request may include an SAS as discussed above with respect to FIGS. 2A and 2B. The SAS may specify the location in the software library 130 which corresponds to the software to be deployed. The SAS includes a token that indicates the types of actions that the user may perform on the software library. If the user is authorized to request the deployment of the software product, the software library 130 may allocate a license key from the key vault 135 and deploy the software to one or more VMs in the tenant computing resources 305 allocated to the tenant in the cloud-based computing environment 110. Otherwise, the deployment will not be performed. The cloud-based computing environment 110 may send a response to the client device 105 indicating whether the request to deploy the software was accepted or denied and whether the deployment was successful if the request was accepted.

A technical benefit of the software library 130 is that the user may deploy seamlessly from the software library 130 to any cloud based VM of the cloud-based computing environment 110 without first downloading the software to the VM. Current approaches to deploying software in such cloud-based environments require the software to be downloaded to the cloud based VM, which consumes data storage as well as processor and network resources. The user would have had to identify and download the appropriate version of the software to the VM. Not only would this approach consume data storage allocated to the tenant but is also subject to human error in identifying the correct version of the software to download. In contrast, the software library 130 may be kept up to date automatically with the latest fixes and updates for the software stored therein. The first-party software provider 140 and the third-party software provider 125 may automatically push updates to the software library 130 or the software library 130 may be configured to periodically check for and download updates for the software stored therein. The software may then be deployed to the cloud-based computing environment 110 by simply referring to appropriate storage location in the software library 130 using the URI. This approach ensures that the software updates are seamless from the tenant perspective and avoid the potential for human error.

Another technical benefit of deploying software from the software library 130 is that the software library 130 provides a temporary directory for each deployment. The temporary directory is allocated automatically by the software library 130 and is deleted upon completion of the deployment or the occurrence of an error during the deployment process. This approach does not consume the data storage allocated to the tenant deploying the software. The user that initiates software deployment does not need to be concerned with ensuring that the tenant has sufficient storage resources available for preparing the software for deployment which may provide a better user experience.

Figure 3B:
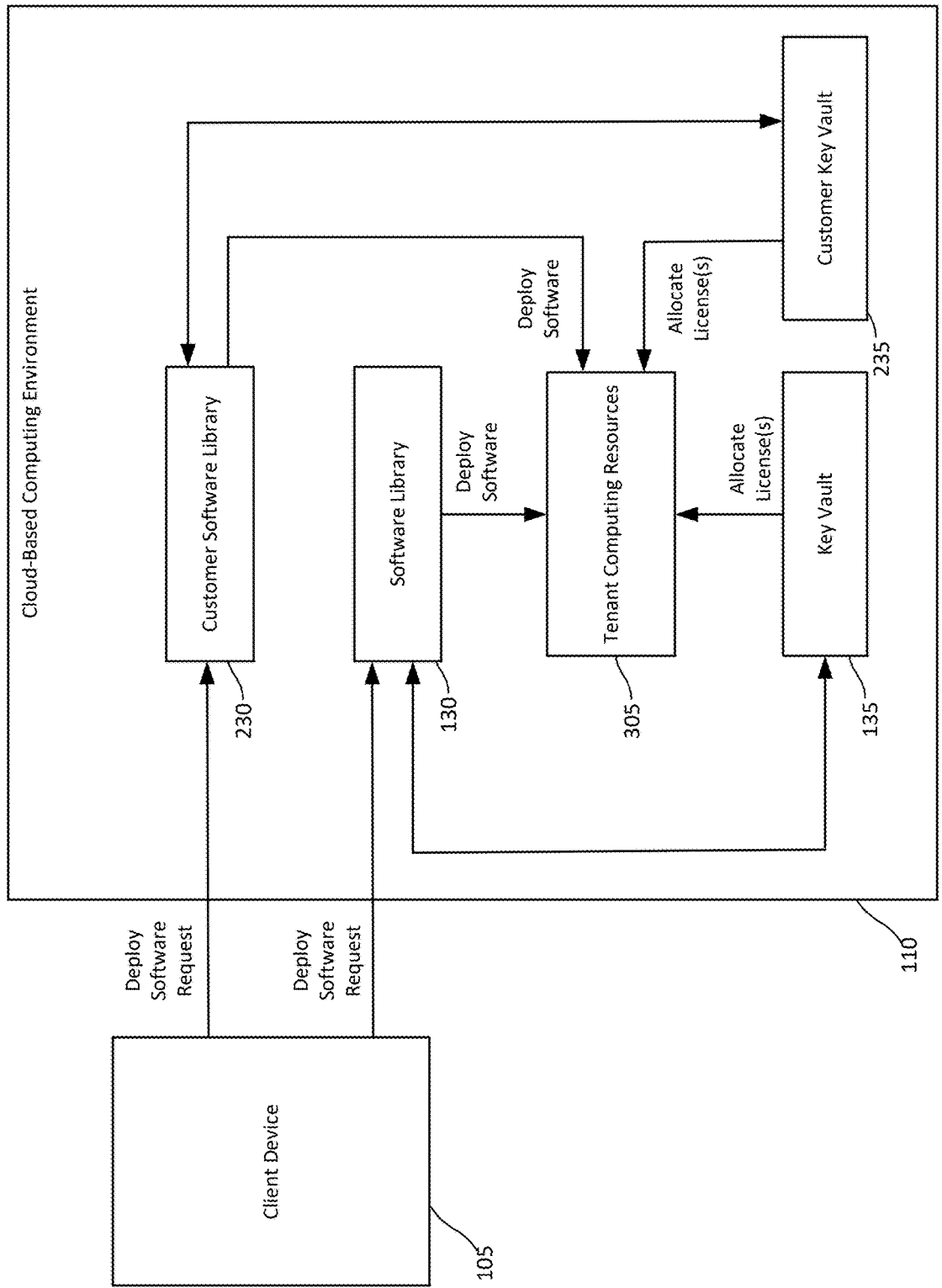

FIG. 3B is a diagram of the cloud-based computing environment 110 that shows how a request to deploy software from a customer-specific software library 230 as well as the customer-specific software library 130 may be implemented. The client device 105 of the user may send an SAS with the deploy software request to the cloud-based computing environment 110 to deploy software from the customer-specific software library 230. The process for deploying software from the customer-specific software library 230 is similar to that used for deploying software from the software library 130. If the user is authorized to request the deployment of the software product from the customer-specific software library 230, the customer-specific software library 230 may allocate a license key from the customer-specific key vault 235. Otherwise, the deployment will not be performed.

FIG. 4 is an example graphical user interface 405 that may be implemented by the cloud-based computing environment 110. The user interface 405 provides a software deployment dashboard that may provide information about the software included in the software library 130, which may include first-party software and third-party software. The user interface 405 may also provide information about the software included in the customer-specific software library 230 associated with the tenant. The user interface 405 may be used to audit the software that is available in the cloud-based computing environment 110. The first-party software provider 140 may verify that the correct versions of their software have been deployed to the software library 130 and which tenants are using the software. The third-party software provider 125 may verify which versions of their software are being used by tenants of the cloud-based computing environment 110. The third-party software provider 125 typically would not have access to information on how their software has been deployed in the cloud-based computing environment 110. The third-party software provider 125 can ensure that the latest version of the software is deployed to the tenants and that the tenants using the software have valid license keys for the instances of the software that have been deployed in the cloud-based computing environment 110. Furthermore, the tenants may also verify which version of their customer-specific software is included in the customer-specific software library 230 and manage the customer-specific software.

The user interface 405 may be displayed on the client device 105 of a user. The user interface 405 may be provided by a native application on the client device 105 configured to communicate with the cloud-based computing environment 110. The user interface 405 may also be a web-based interface provided by the cloud-based computing environment 110 that is accessible via a web-browser or browser-enabled application on the client device 105.

The user interface 405 may provide a first control, which, when activated, causes the license keys associated with a particular software product to be displayed. In the example shown in FIG. 4, the first control is a "View License Keys" button that may be clicked on or otherwise activated to cause the user interface presenting the license key information to be displayed. An example of such a user interface is shown in FIG. 5A.

The user interface 405 may provide a second control, which, when activated, causes the a deploy software user interface to be displayed that may guide the user through configuring the deployment. In the example shown in FIG. 4, the second control is a "Deploy Software" button that may be clicked on or otherwise activated to cause the deploy software user interface to be displayed.

The cloud-based computing environment 110 may control which users may access the software deployment dashboard based on the attributes associated with the user profile of the user that has launched the software deployment dashboard on their respective client device 105. The cloud-based computing environment 110 may determine whether the user may view the software stored in the software library 130 and/or the customer-specific software library 230, view the license keys, and/or view the deploy software to the cloud-based computing environment. The user may be prevented from accessing the software deployment dashboard if the user is not permitted to view the contents of the software library 130 and/or the software library 230. If the user is permitted to view the contents of the software libraries but not to view the license keys, the "View License Keys" button may be disabled on the user interface 405 for all software or selectively disabled for software the software for which the user does not have permission to view the license keys. If the user is permitted to view the contents of the software libraries but not to deploy software, the "Deploy Software" button may be disabled on the user interface 405 for all software or selectively disabled for software the software for which the user does not have permission to deploy the software.

FIG. 5A is an example graphical user interface 505 that may be implemented by the cloud-based computing environment 110. The user interface 505 provides a software license management dashboard that may provide information about the license keys available to a tenant in the key vault 135 and/or the customer key vault 235. The first-party software provider 140 and/or the third-party software provider 125 may use the interface 505 to view information about the license keys that one or more tenants of the cloud-based computing environment 110 have included in the key vault 135 and/or the customer-specific key vault 235. The tenants of the cloud-based computing environment 110 may also view and/or manage the license keys that have been acquired for the tenant and are stored in the key value 135 and/or the customer-specific key vault 235. A tenant is unable to see the license keys associated with other tenants.

The user interface 505 may provide a control, which when activated, causes the user interface 510 shown in FIG. 5B to be displayed. The user interface 510 may display detailed information about the license keys and provide means for filtering the list of license keys shown. For example, the user interface 510 may provide means for filtering the licenses keys to show all license keys associated with the software application, in-use license keys associated with the software application, unassigned license keys. The user interfaces 505 and 510 may be provided by a native application on the client device 105 configured to communicate with the cloud-based computing environment 110. The user interfaces 505 and 510 may also be a web-based interface provided by the cloud-based computing environment 110 that is accessible via a web-browser or browser-enabled application on the client device 105.

The cloud-based computing environment 110 may control access to the software license information in a similar manner as the access to the software in the library may be controlled as discussed in the preceding examples. The client device 105 of the user attempting to access the license information via the user interfaces 505 and 510. The client device 105 of the user may provide an SAS to the cloud-based computing environment 110 that references the key vault 135 for first-party or third-party software license keys or the customer-specific key vault 235 for customer-specific software license keys. The cloud-based computing environment 110 may determine based on the SAS which actions the user may perform on the key vault 135 and/or the customer-specific key vault. Users may be limited to viewing or managing license keys for the tenant with which the user is associated. A technical benefit of this approach is that it prevents users from viewing and/or manipulating the license keys of other tenants. Furthermore, some users may be permitted only view and/or manage the licenses associated with certain applications.

Figure 6:
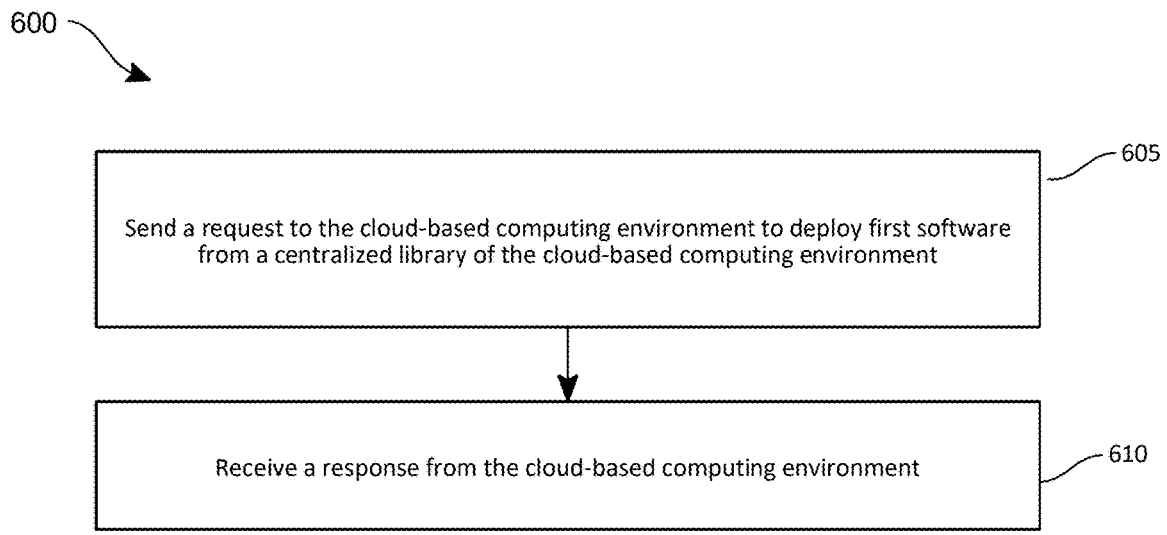
FIG. 6 is a flow chart of an example process 600 for requesting software to be deployed on a cloud-based computing environment.

FIG. 6 is a flow chart of an example process 600 for requesting software be deployed on a cloud-based computing environment. The process 600 may be implemented by a client device 105 shown in the preceding examples.

The process 600 may include an operation 605 of sending a request to the cloud-based computing environment 110 to deploy first software from a centralized library of the cloud-based computing environment 110. A user may access the software deployment dashboard of user interface 405 shown in FIG. 4. The user may click on or otherwise activate the "deploy software" button to cause the request to be sent to the cloud-based computing environment 110. The user interface 405 may prompt the user to enter or provide the deployment parameters indicating how the first software should be deployed in the cloud-based environment. The request may also include authentication credentials for a user, which may be a SAS that includes a URI that points to the location of the software that is being requested to be deployed. The SAS may also be digitally signed so that the cloud-based computing environment 110 may authenticate the user sending the request and deny the request if the user is not authorized to deploy the software.

The process 600 may include an operation 610 of receiving a response from the cloud-based computing environment 110. The cloud-based computing environment 110 may provide an indication whether the request was accepted or denied. If the request was denied, the response from the cloud-based computing environment 110 may provide an indication why the request was denied. If the request was accepted, the cloud-based computing environment 110 may provide a confirmation once the deployment has been completed.

Figure 7:
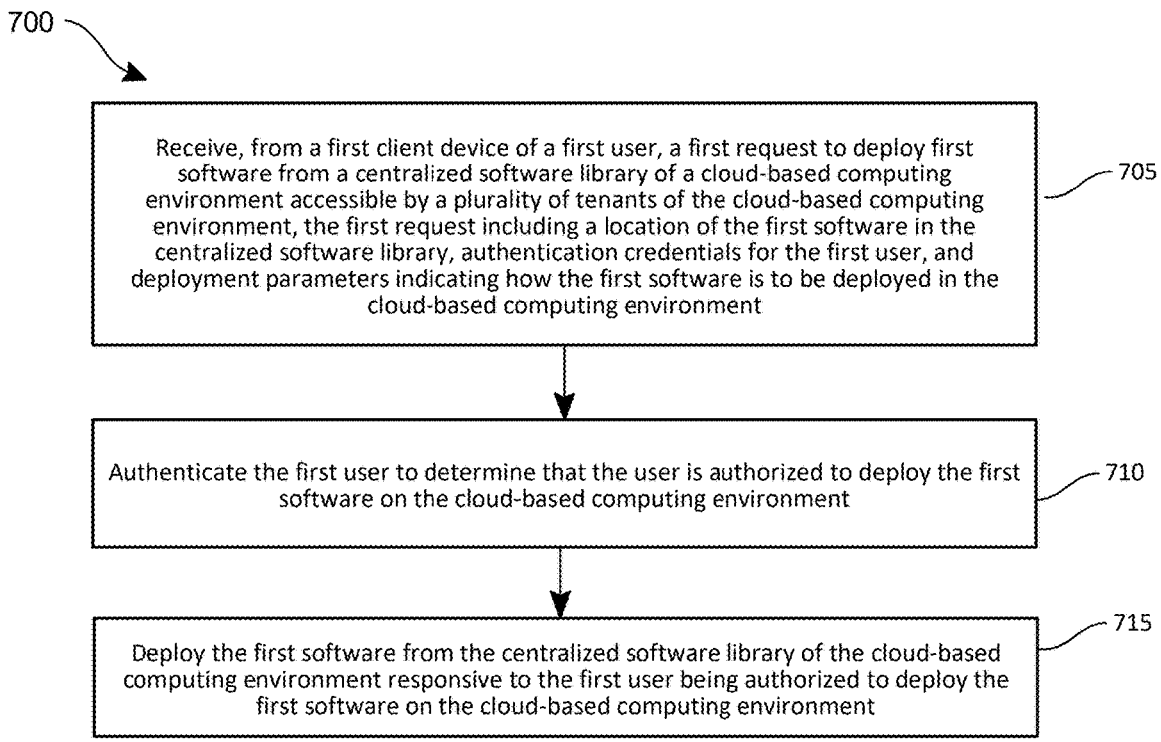
FIG. 7 is a flow chart of an example process 700 for deploying software on a cloud-based computing environment.

FIG. 7 is a flow chart of an example process 700 for deploying software on a cloud-based computing environment. The process 700 may be implemented by the cloud-based computing environment 110 shown in the preceding examples.

The process 700 may include an operation 705 of receiving, from a first client device 105 of a first user, a first request to deploy first software from a centralized software library of a cloud-based computing environment accessible by a plurality of tenants of the cloud-based computing environment. The first request includes a location of the first software in the centralized library, authentication credentials for the first user, and deployment parameters indicating how the first software is to be deployed in the cloud-based computing environment. As discussed in the preceding examples, a user may request that software be deployed in the cloud-based computing environment 110. The request may include an SAS, which includes an URI that points to the location of the first software in the storage of the cloud-based computing environment 110 in which the first software is stored. The SAS also includes a signed token.

The process 700 may include an operation 710 of authenticating the first user to determine that the user is authorized to deploy the first software in the cloud-based computing environment. As discussed in the preceding examples, the cloud-based computing environment 110 may be configured to determine whether the user permitted to deploy software in the cloud-based computing environment 110 by determining whether the signature on the SAS is valid and by determining whether the user attributes associated with the user indicate that the user is permitted to deploy software in the cloud-based computing environment 110.

The process 700 may include an operation 715 of deploying the first software from the centralized library of the cloud-based computing environment responsive to the first user being authorized to deploy the first software in the cloud-based computing environment. The first software is deployed to the cloud-based services directly from the software library 130. This approach saves memory and computing resources in the cloud-based computing environment, because the first software does not need to be downloaded into storage allocated to the tenant before being deployed to the cloud-based computing environment 110.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
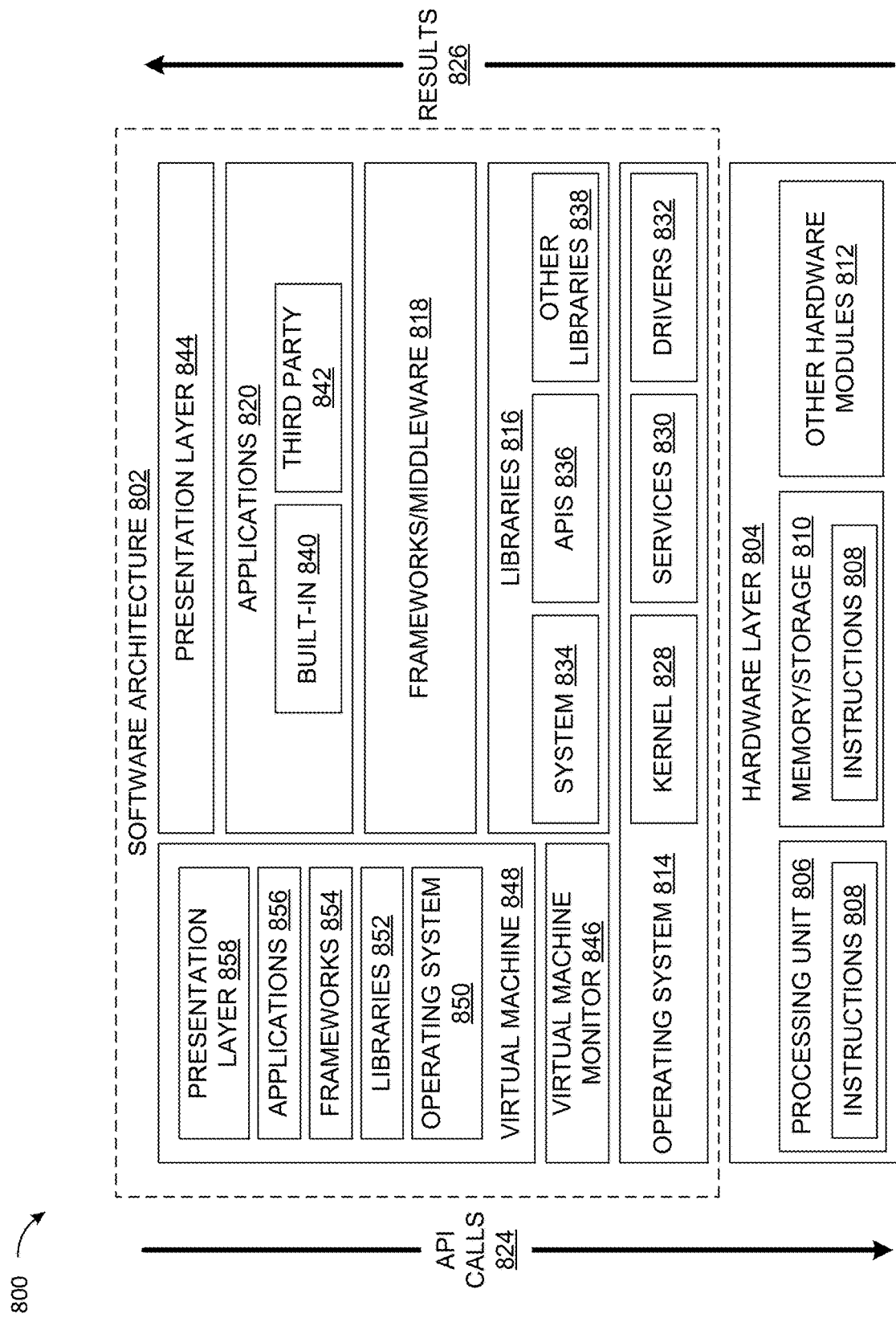
FIG. 8 is a block diagram showing an example of software architecture, various portions of which may be used in conjunction with various hardware architectures herein described, which may implement any of the described features

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs 836 for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
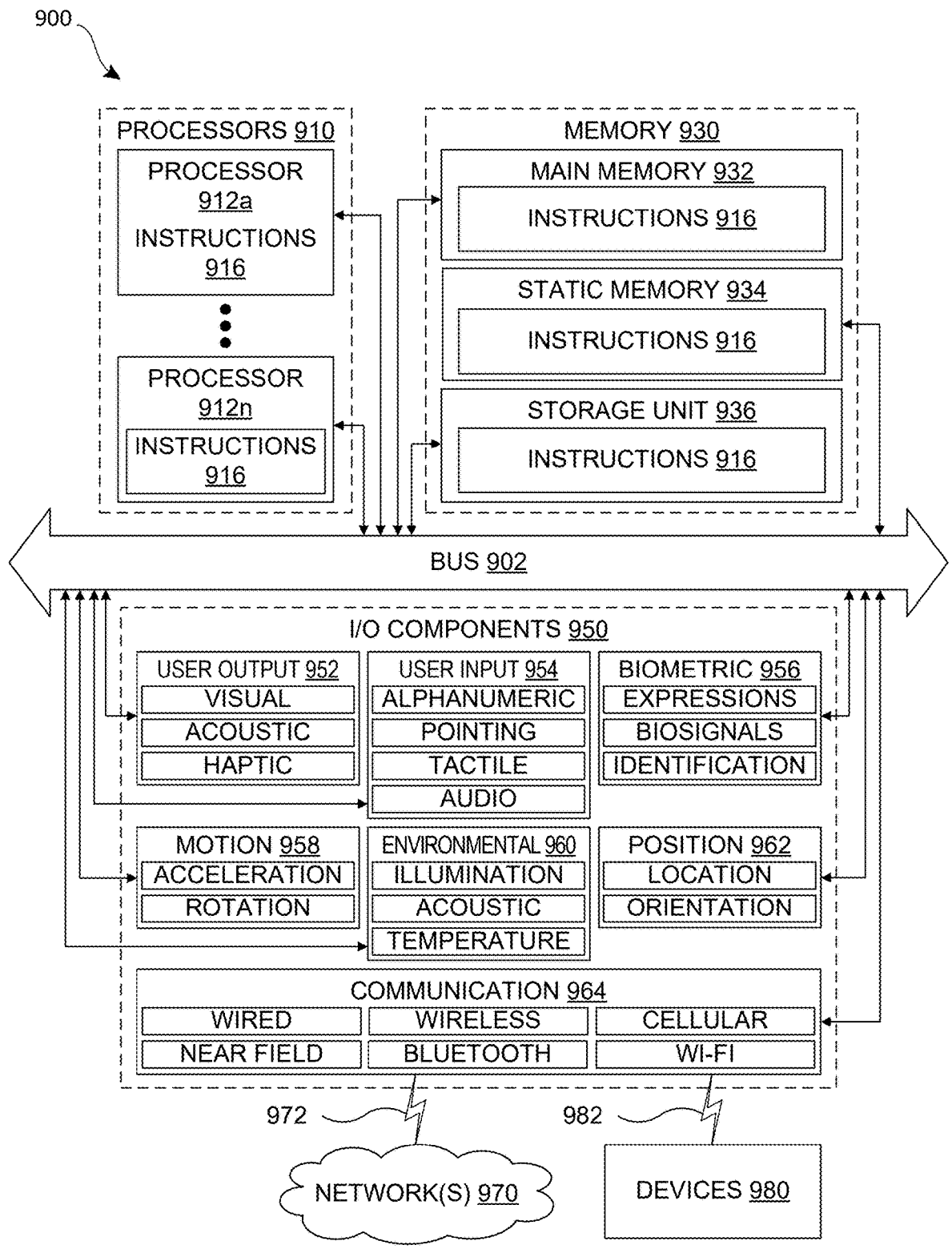
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor to perform operations comprising:
receiving, from a first client device of a first user associated with a first tenant of a cloud-based computing environment, a first request to deploy first software from a centralized software library stored in a memory of the cloud-based computing environment accessible by a plurality of tenants of the cloud-based computing environment, the first request including a location of the first software in the centralized software library, authentication credentials for a first user, and deployment parameters indicating how the first software is to be deployed in the cloud-based computing environment, the authentication credentials include a first shared access signature (SAS) that includes a Universal Resource Indicator (URI) referencing a storage location of the cloud-based computing environment in which the first software is stored;
authenticating the first user to determine that the first user is authorized to deploy the first software in the cloud-based computing environment;
deploying, based on the deployment parameters, the first software from the centralized software library of the cloud-based computing environment to one or more virtual machines in computing resources associated with the first tenant on the cloud-based computing environment without having to download the first software to the one or more virtual machines responsive to the first user being authorized to deploy the first software in the cloud-based computing environment;
receiving, from a second client device of a second user, a second request to add second software to a customer-specific software library associated with a second tenant of the cloud-based computing environment, the second request including a second SAS, the customer-specific software library being accessible only to users associated with the second tenant;
verifying that a signature on the second SAS is valid; and
adding the second software to the customer-specific software library responsive to the signature on the second SAS being valid.

2. The data processing system of claim 1, wherein authenticating the first user comprises:
verifying that a signature on the first SAS is valid; and
authenticating the first user responsive to the signature on the first SAS being valid.

3. The data processing system of claim 2, wherein the machine-readable medium further comprises instructions configured to cause the processor to perform operations comprising:
receiving, from a second client device of a second user, a second request a prior to the first request, to add the first software to the centralized software library of the cloud-based computing environment, the second request including a second SAS;
verifying that the signature on the second SAS is valid; and
adding the first software to the centralized software library responsive to the signature on the second SAS being valid.

4. The data processing system of claim 1, wherein the machine-readable medium further comprises instructions configured to cause the processor to perform operations comprising:
receiving, from a fourth client device of a fourth user, a fourth request to deploy the second software from the customer-specific software library, the fourth request including a location of the second software in the customer-specific software library, authentication credentials for a fourth user, and deployment parameters indicating how the second software is to be deployed in the cloud-based computing environment;
authenticating the fourth user to determine that the fourth user is authorized to deploy the second software in the cloud-based computing environment; and
deploying the second software from the customer-specific software library of the cloud-based computing environment responsive to the fourth user being authorized to deploy the second software in the cloud-based computing environment.

5. The data processing system of claim 4, wherein the machine-readable medium further comprises instructions configured to cause the processor to perform operations comprising:
causing to be presented on a display of the first client device a license key management user interface for managing a license key associated with the first software.

6. A method implemented in a data processing system for deploying software on a cloud-based computing environment, the method comprising:
receiving, from a first client device of a first user associated with a first tenant of a cloud-based computing environment, a first request to deploy first software from a centralized software library stored in a memory of the cloud-based computing environment accessible by a plurality of tenants of the cloud-based computing environment, the first request including a location of the first software in the centralized software library, authentication credentials for a first user, and deployment parameters indicating how the first software is to be deployed in the cloud-based computing environment, the authentication credentials include a first shared access signature (SAS) that includes a Universal Resource Indicator (URI) referencing a storage location of the cloud-based computing environment in which the first software is stored;
authenticating the first user to determine that the first user is authorized to deploy the first software in the cloud-based computing environment;
deploying, based on the deployment parameters, the first software from the centralized software library of the cloud-based computing environment to one or more virtual machines in computing resources associated with the first tenant on the cloud-based computing environment without having to download the first software to the one or more virtual machines responsive to the first user being authorized to deploy the first software in the cloud-based computing environment;

receiving, from a second client device of a second user, a second request to add second software to a customer-specific software library associated with a second tenant of the cloud-based computing environment, the second request including a second SAS, the customer-specific software library being accessible only to users associated with the second tenant;

verifying that a signature on the second SAS is valid; and adding the second software to the customer-specific software library responsive to the signature on the second SAS being valid.

7. The method of claim 6, wherein authenticating the first user comprises:

verifying that a signature on the first SAS is valid; and
authenticating the first user responsive to the signature on the first SAS being valid.

8. The method of claim 7, further comprising:

receiving, from a second client device of a second user, a second request a prior to the first request, to add the first software to the centralized software library of the cloud-based computing environment, the second request including a second SAS;

verifying that the signature on the second SAS is valid; and adding the first software to the centralized software library responsive to the signature on the second SAS being valid.

9. The method of claim 6, further comprising:

receiving, from a fourth client device of a fourth user, a fourth request to deploy the second software from the customer-specific software library, the fourth request including a location of the second software in the customer-specific software library, authentication credentials for a fourth user, and deployment parameters indicating how the second software is to be deployed in the cloud-based computing environment;

authenticating the fourth user to determine that the fourth user is authorized to deploy the second software in the cloud-based computing environment; and deploying the second software from the customer-specific software library of the cloud-based computing environment responsive to the fourth user being authorized to deploy the software in the cloud-based computing environment.

10. The method of claim 9, further comprising:

causing to be presented on a display of the first client device a license key management user interface for managing a license key associated with the first software.

11. A machine-readable medium on which are stored instructions that, when executed, cause a processor of a programmable device to perform functions of:

receiving, from a first client device of a first user associated with a first tenant of a cloud-based computing environment, a first request to deploy first software from a centralized software library stored in a memory of the cloud-based computing environment accessible by a plurality of tenants of the cloud-based computing environment, the first request including a location of the first software in the centralized software library, authentication credentials for a first user, and deployment parameters indicating how the first software is to be deployed in the cloud-based computing environment, the authentication credentials include a first shared access signature (SAS) that includes a Universal Resource Indicator (URI) referencing a storage location of the cloud-based computing environment in which the first software is stored;

authenticating the first user to determine that the first user is authorized to deploy the first software in the cloud-based computing environment;

deploying, based on the deployment parameters, the first software from the centralized software library of the cloud-based computing environment to one or more virtual machines in computing resources associated with the first tenant on the cloud-based computing environment without having to download the first software to the one or more virtual machines responsive to the first user being authorized to deploy the first software in the cloud-based computing environment;

receiving, from a second client device of a second user, a second request to add second software to a customer-specific software library associated with a second tenant of the cloud-based computing environment, the second request including a second SAS, the customer-specific software library being accessible only to users associated with the second tenant;

verifying that a signature on the second SAS is valid; and adding the second software to the customer-specific software library responsive to the signature on the second SAS being valid.

12. The machine-readable medium of claim 11, wherein authenticating the first user comprises:

verifying that a signature on the first SAS is valid; and
authenticating the first user responsive to the signature on the first SAS being valid.

13. The machine-readable medium of claim 12, further comprising instructions configured to cause the processor to perform operations comprising:

receiving, from a second client device of a second user, a second request a prior to the first request, to add the first software to the centralized software library of the cloud-based computing environment, the second request including a second SAS;

verifying that the signature on the second SAS is valid; and adding the first software to the centralized software library responsive to the signature on the second SAS being valid.

14. The machine-readable medium of claim 13, further comprising instructions configured to cause the processor to perform operations comprising:

receiving, from a fourth client device of a fourth users, a fourth request to deploy the second software from the customer-specific software library, the fourth request including a location of the second software in the customer-specific software library, authentication credentials for a fourth user, and deployment parameters indicating how the second software is to be deployed in the cloud-based computing environment;

authenticating the fourth user to determine that the fourth user is authorized to deploy the second software in the cloud-based computing environment; and deploying the second software from the customer-specific software library of the cloud-based computing environment responsive to the fourth user being authorized to deploy the second software in the cloud-based computing environment.

* * * * *